United States Patent
Okouchi (10) Patent No.: US 6,324,938 B1
(45) Date of Patent: Dec. 4, 2001

(54) LOCKING BICYCLE CABLE CONNECTING APPARATUS

(75) Inventor: Hiroyuki Okouchi, Shimonoseki (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/514,758

(22) Filed: Feb. 28, 2000

(51) Int. Cl.⁷ ..................................................... F16C 1/22
(52) U.S. Cl. .............................. 74/502.6; 403/309
(58) Field of Search .................... 74/501.5 R, 502.4, 74/502.6; 403/309, 310, 313; 280/236, 238

(56) References Cited

U.S. PATENT DOCUMENTS

| | | | |
|---|---|---|---|
| 3,020,778 | 2/1962 | Davidson | 74/489 |
| 4,833,937 | 5/1989 | Nagano | 74/501.5 |
| 5,156,064 | * 10/1992 | Truman | 74/502.6 |
| 5,564,311 | 10/1996 | Chen | 74/489 |
| 5,613,406 | * 3/1997 | Rutkowski | 74/502.6 |
| 5,615,584 | * 4/1997 | Irish | 74/502.6 |
| 5,664,461 | * 9/1997 | Kitamura | 74/502.6 |
| 5,674,142 | * 10/1997 | Jordan | 74/502.4 |
| 5,850,763 | * 12/1998 | Kitamura | 74/502.6 |
| 5,916,329 | 6/1999 | Meier-Burkamp et al. | 74/502.2 |

FOREIGN PATENT DOCUMENTS

| | | |
|---|---|---|
| 29608010 U1 | 9/1996 | (DE) . |
| 105176 A2 | 4/1984 | (EP) . |
| 518203 A1 | 12/1992 | (EP) . |
| 61-37508 | 3/1986 | (JP) . |
| 61-45614 | 3/1986 | (JP) . |
| 62-40327 | 3/1987 | (JP) . |
| 63-80315 | 5/1988 | (JP) . |
| 2-141713 | 11/1990 | (JP) . |
| 5-32820 | 4/1993 | (JP) . |
| 7-6080 | 1/1995 | (JP) . |

* cited by examiner

*Primary Examiner*—Thomas R. Hannon
*Assistant Examiner*—Chong H. Kim
(74) *Attorney, Agent, or Firm*—James A. Deland (57) ABSTRACT

A connecting member includes an outer casing support portion having a first end and a second end, wherein the first end has a casing support opening for supporting the outer casing of the control cable. A wire guiding projection extends from the second end of the outer casing support portion along a first connecting member axis. The wire guiding projection includes a first side wall extending in the direction of the first connecting member axis, a second side wall extending in the direction of the first connecting member axis and opposite the first side wall, a third side wall extending in a direction of the first connecting member axis, a fourth side wall extending in a direction of the first connecting member axis and opposite the third side wall, and an inner wire passage for receiving the inner wire therethrough. A distance between the first side wall and the second side wall is less than a distance between the third side wall and the fourth side wall. A first abutment is formed at a junction of the second end of the outer casing support portion and wire guiding projection and faces at least in part in a direction of the first connecting member axis away from the first end, and a retaining structure different from the first side wall and the second side wall is immovably disposed at the first abutment. The retaining structure rotates with the first connecting member and forms a second abutment facing at least in part in a circumferential direction.

29 Claims, 8 Drawing Sheets

LOCKING BICYCLE CABLE CONNECTING APPARATUS

BACKGROUND OF THE INVENTION

The present invention is directed to cable connecting devices and, more particularly, to a locking bicycle cable connecting apparatus.

In their simplest forms, connectors are used to connect one cable to another. In more complicated cable assemblies such as Bowden cable assemblies where an inner wire slides within an outer casing, it is sometimes necessary to connect the entire cable assembly to another cable assembly or to connect the outer casing to another tubular member while the inner wire is connected to some other structure. An example of the latter is disclosed in U.S. Pat. No. 4,833,937. That patent discloses a connector having a first portion for terminating the outer casing of a Bowden cable and a threaded second portion that screws into another structure. While such a connector reliably connects the outer casing to the other structure, the connector must be unscrewed several turns before the cable assembly can be disconnected from the other structure. The same is true when the outer casing is to be connected to the other structure. Thus, there is a need for a cable connector that allows the outer casing of a Bowden cable assembly to be quickly connected to and disconnected from another structure.

SUMMARY OF THE INVENTION

The present invention is directed to a cable connecting apparatus which allows the outer casing of a Bowden cable assembly to be quickly connected to and disconnected from another structure. In one embodiment of the present invention, a first connecting member includes an outer casing support portion having a first end and a second end, wherein the first end has a casing support opening for supporting the outer casing of the control cable. A wire guiding projection extends from the second end of the outer casing support portion along a first connecting member axis. The wire guiding projection includes a first side wall extending in the direction of the first connecting member axis, a second side wall extending in the direction of the first connecting member axis and opposite the first side wall, a third side wall extending in a direction of the first connecting member axis, a fourth side wall extending in a direction of the first connecting member axis and opposite the third side wall, and an inner wire passage for receiving the inner wire therethrough. A distance between the first side wall and the second side wall is less than a distance between the third side wall and the fourth side wall. At least one of the outer casing support portion and the wire guiding projection is continuous in a circumferential direction. A first abutment is formed at a junction of the second end of the outer casing support portion and wire guiding projection and faces at least in part in a direction of the first connecting member axis away from the first end, and a retaining structure different from the first side wall and the second side wall is immovably disposed at the first abutment. The retaining structure rotates with the first connecting member and forms a second abutment facing at least in part in a circumferential direction.

In another embodiment of the present invention, a connecting member includes an outer casing support portion having a first end and a second end, wherein the first end has a casing support opening for supporting the outer casing of the control cable. A wire guiding projection extends from the second end of the outer casing support portion along a first connecting member axis, wherein the wire guiding projection includes an inner wire passage for receiving the inner wire therethrough. The wire guiding projection includes a radially extending locking member outside the inner wire passage, wherein the locking member forms a first abutment facing at least in part in a direction of the first connecting member axis toward the first end. A second abutment is formed at a junction of the second end of the outer casing support and wire guiding projection and faces at least in part in a direction of the first connecting member axis away from the first end. A retaining structure is immovably disposed on one of the second end of the outer casing support and the wire guiding projection. The retaining structure rotates with the first connecting member, forms a third abutment facing at least in part in a circumferential direction, and is spaced apart in the direction of the first connecting member axis from one of the first abutment and the second abutment.

In still another embodiment of the present invention, a connecting member includes an outer casing support portion having a first end and a second end, wherein the first end has a casing support opening for supporting the outer casing of the control cable. A wire guiding projection extends from the second end of the outer casing support portion along a first connecting member axis. The wire guiding projection includes an unthreaded outer peripheral surface along its entire length in the direction of the first connecting member axis and an inner wire passage for receiving the inner wire therethrough. In this embodiment at least one of the outer casing support portion and the wire guiding projection is continuous in a circumferential direction. A first abutment is formed at a junction of the second end of the outer casing support and wire guiding projection and faces at least in part in a direction of the first connecting member axis away from the first end. A retaining structure is immovably disposed at the first abutment, wherein the retaining structure rotates with the first connecting member and forms a second abutment facing at least in part in a circumferential direction.

DETAILED DESCRIPTION OF THE EMBODIMENTS

Figure 1:
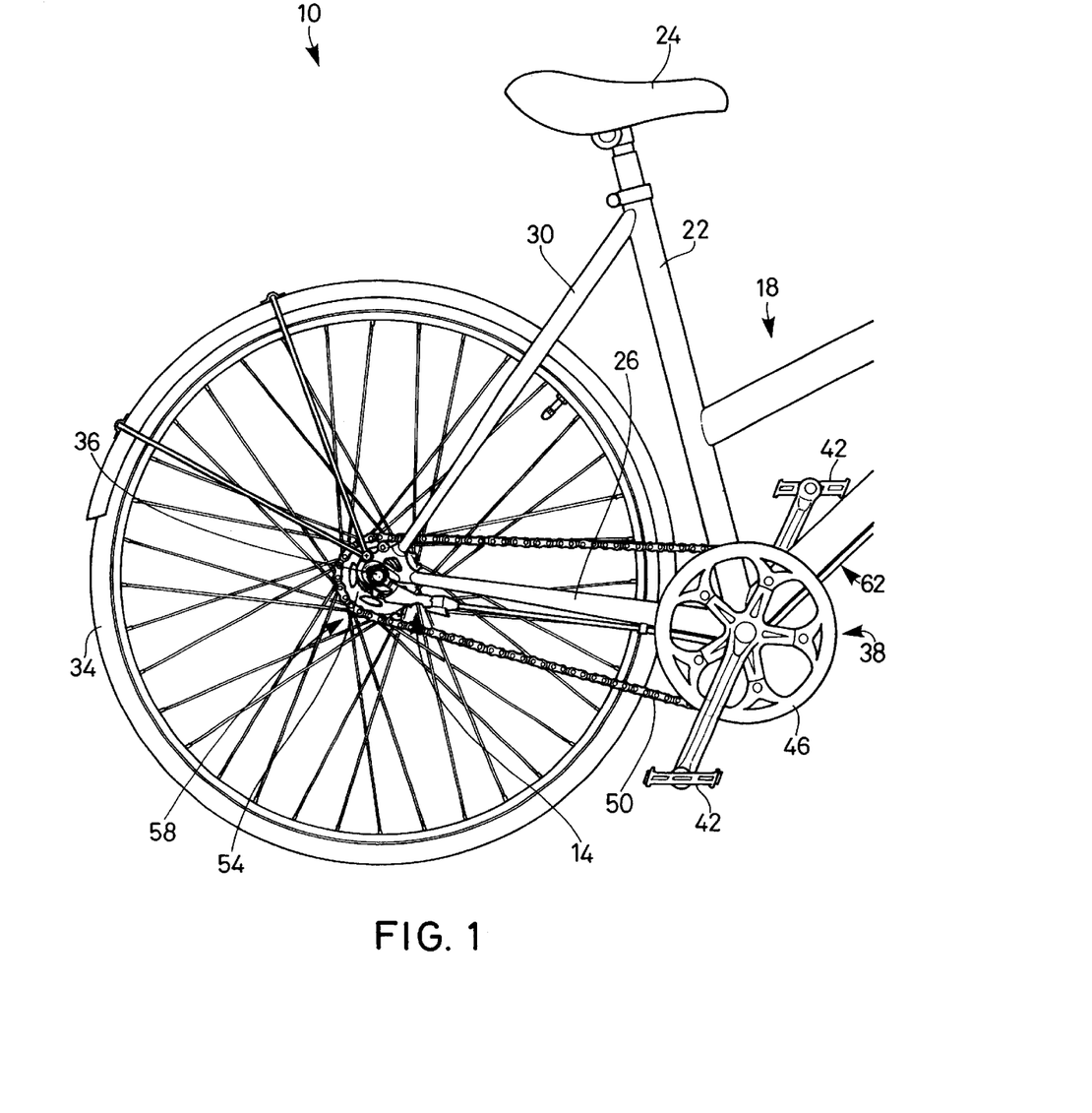
FIG. 1 is a side view of a rear portion of a bicycle that incorporates a particular embodiment of a locking bicycle cable connecting apparatus according to the present invention.

FIG. 1 is a side view of a rear portion of a bicycle 10 that incorporates a particular embodiment of a locking bicycle cable connecting apparatus 14 according to the present invention. The rear portion of bicycle 10 includes a frame 18 with a seat tube 22 supporting a saddle 24, a pair of conventional chain stays 26, and a pair of conventional seat stays 30. A wheel 34 is rotatably supported by frame 18 around an axle 36 at the intersection of chain stays 26 and seat stays 30, and a crank assembly 38 having pedals 42 and a chain ring 46 is rotatably supported at the intersection of seat tube 22 and chain stays 26. A chain 50 engages chain ring 46 and wraps around a sprocket 54 that rotatably drives a conventional internal hub transmission 58 around axle 36. A Bowden-type control cable 62 is used to change speed stages of internal hub transmission 58 in a known manner.

Figure 2:
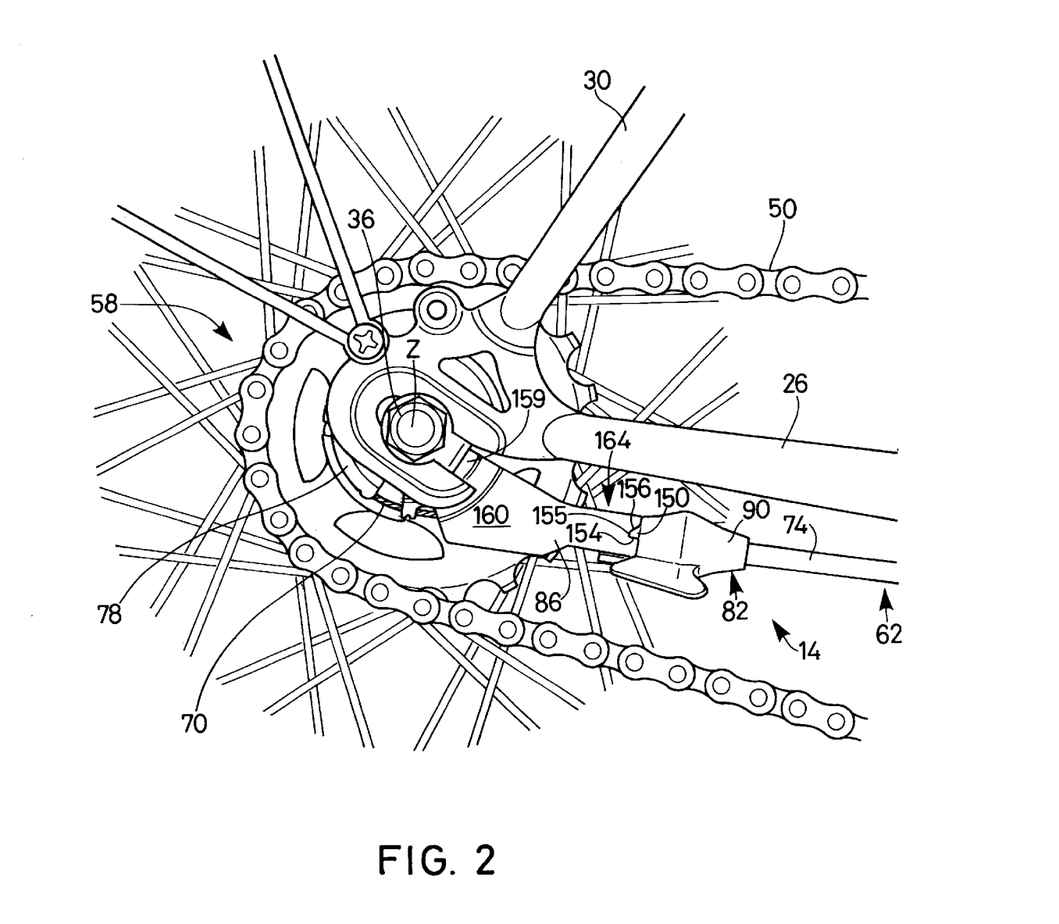
FIG. 2 is a more detailed view of the locking bicycle cable connecting apparatus.

FIG. 2 is a more detailed view of cable connecting apparatus 14. As is well known, Bowden cable 62 includes an inner wire 70 that slides within an outer casing 74. Inner wire 70 connects directly to a conventional hub transmission clutch actuating ring 78, whereas outer casing 74 is terminated at an outer casing terminating member 82 (which functions as a first cable connecting member) which, in turn, is connected to a cable support 86 (which functions as a second cable connecting member) that also rotatably supports actuating ring 78.

Figure 3:
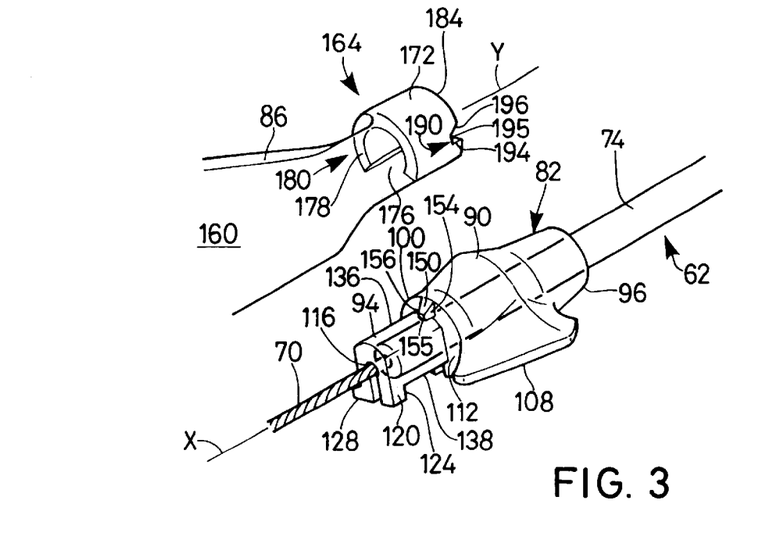
FIG. 3 is an exploded view of the cable connecting apparatus showing the first and second cable connecting members in more detail.
Figure 4:
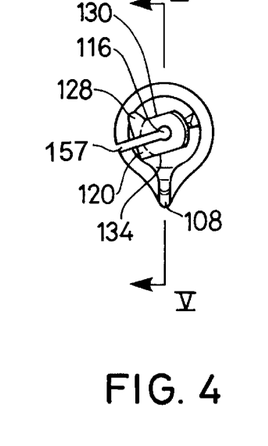
FIG. 4 is a front view of the first cable connecting member.
Figure 5:
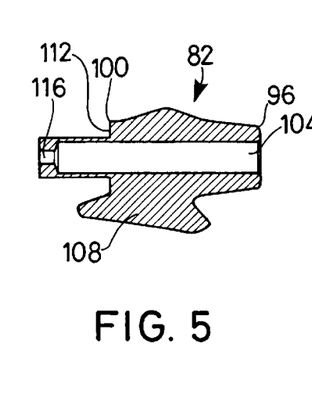
FIG. 5 is a view taken along line V—V in FIG. 4.

As shown in FIGS. 2–5, outer casing terminating member 82 includes an outer casing support portion 90 and a wire guiding projection 94 that is unthreaded along its entire length. Outer casing support portion 90 has the form of a generally convex casing support tube with a first end 96 and a second end 100. First end 96 has a casing support opening 104 (FIG. 5) for supporting outer casing 74 of Bowden cable 62. Casing support opening 104 also functions as a wire receiving passage that allows inner wire 70 to pass completely through outer casing support portion 90. As shown in FIG. 5, in this embodiment casing support opening 104 extends into wire guiding projection. A finger operating member in the form of a finger operating tab 108 extends radially outwardly from outer casing support portion 90.

Second end 100 of outer casing support portion 90 forms an abutment 112, and wire guiding projection 94 extends as one piece from abutment 112 along a first connecting member axis X which is coaxial with inner wire 70. Abutment 112 faces at least in part in a direction of first connecting member axis X away from first end 96. Wire guiding projection 94 is a generally tubular member that includes an inner wire passage 116 for receiving inner wire 70 therethrough, and a radially outwardly extending locking member 120 forming an abutment 124 facing at least in part in a direction of first connecting member axis X toward first end 96 of outer casing support portion 90. A stopper member 128 extends from locking member 120 in a circumferential direction for reasons discussed below.

Figures 7, 8:
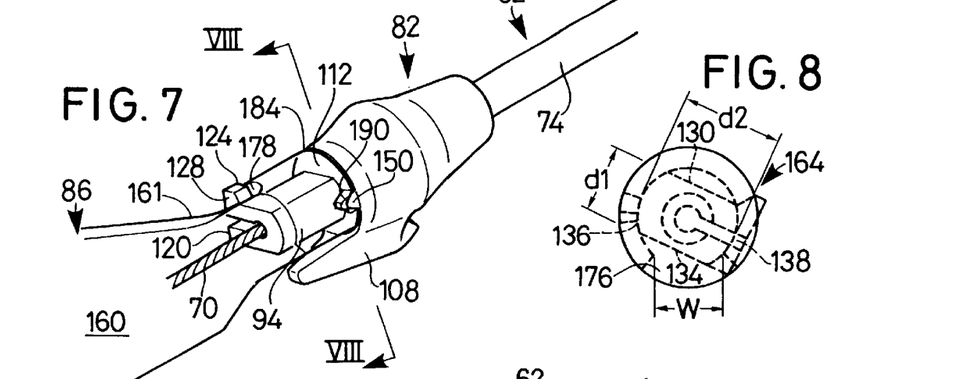
FIG. 7 is a view of the cable connecting apparatus in a locked state.
FIG. 8 is a view taken along line VIII—VIII in FIG. 7.

As shown in FIGS. 4 and 8, wire guiding projection 94 includes a straight first side wall 130 extending in the direction of first connecting member axis X, a straight second side wall 134 extending in the direction of first connecting member axis X parallel to first side wall 130, a third side wall 136 extending in a direction of first connecting member axis X, and a fourth side wall 138 extending in a direction of first connecting member axis X and opposite third side wall 136. A distance d1 between first side wall 130 and second side wall 134 is less than a distance d2 between third side wall 136 and fourth side wall 138 for reasons discussed below.

A retaining projection 150 immovably extends as one piece from abutment 112 of outer casing support portion 90 in a direction of first connecting member axis X, wherein retaining projection 150 is disposed radially outwardly from wire guiding projection 94 and terminates before wire guiding projection 94 in the direction of first connecting member axis X. As shown in FIGS. 2 and 3, retaining projection 150 forms an abutment 154 facing in a circumferential direction, an end wall 155 facing in the direction of first connecting member axis X, and a cam wall 156 facing in the circumferential direction and inclined relative to abutments 112 and 154. Preferably, retaining projection 150 is spaced apart in the direction of first connecting member axis X from one of abutment 112 and abutment 124, in this case abutment 124. If desired, retaining projection 150 also may be radially spaced apart from wire guiding projection 94.

As shown in FIG. 4, a slot 157 extends through outer casing support portion 90 and wire guiding projection 94. Thus, outer casing terminating member 82 may be attached to cable 62 by placing inner wire 70 through slot 157 and then fitting outer casing 74 into casing support opening 104.

Figure 6:
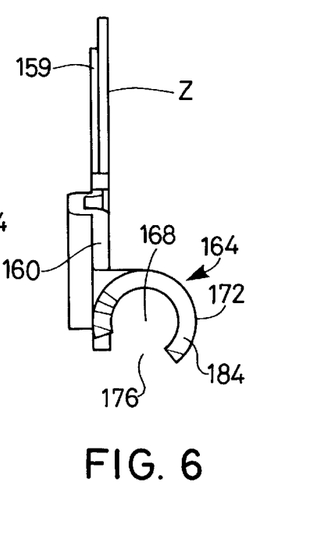
FIG. 6 is a front view of the second cable connecting member.

As shown in FIGS. 3 and 6, cable support 86 includes a tubular portion 164 on one end defining a first connecting member opening 168 for receiving wire guiding projection 94 therethrough. Tubular portion 164 has a first tubular portion side wall 172 extending along a second connecting member axis Y, a second tubular portion side wall 178 substantially perpendicular to second connecting member axis Y, and a third tubular portion side wall 184 substantially perpendicular to second connecting member axis Y and opposite second tubular portion side wall 178. In this embodiment, first connecting member axis X is coaxial with second connecting member axis Y when outer casing terminating member 82 is coupled to cable support 86 as shown in FIG. 2.

First tubular portion side wall 172 defines a first passage 176 having a width W (FIG. 8) for passing locking member 120 in the direction of second connecting member axis Y away from first connecting member opening 168. Width W is greater than or equal to diameter d1 but less than diameter d2 of wire guiding projection 94 for reasons discussed below. Second tubular portion side wall 178 forms a second passage 180 extending from first passage 176 in a circumferential direction. Third tubular portion side wall 184 includes a retaining recess 190 that has a shape complementary to retaining projection 150. More specifically, retaining recess 190 forms an abutment 194 facing in a circumferential direction, a bottom wall 195 facing in the direction of second connecting member axis Y, and a cam wall 196 facing in the circumferential direction and inclined relative to abutment 194.

A plate-shaped intermediate portion 160 extends from tubular portion 164 and terminates at an annular frame coupling member 159. Annular frame coupling member 159 has a central axis Z oriented substantially perpendicular to second connecting member axis Y. Annular frame coupling member 159 surrounds axle 36 of hub transmission 58 and rotatably supports actuating ring 78 in a known manner.

FIGS. 2 and 7 show cable connecting apparatus 14 in a locked state. In this state, abutment 112 abuts against third tubular portion side wall 184, retaining projection 150 engages retaining recess 190 to inhibit rotation of outer casing terminating member 82 relative to cable support 86, abutment 124 of locking member 120 abuts against second tubular portion side wall 178 to prevent outer casing terminating member 82 from moving away from cable support 86, and stopper member 128 abuts against a side wall 161 of intermediate portion 160 to further prevent rotation of outer casing terminating member 82 relative to cable support 86. Since the width W of passage 176 in tubular portion 164 of cable support 86 is less than the diameter d2 of wire guiding projection 94, wire guiding projection 94 cannot come out of passage 176 when outer casing terminating member 82 is in the position shown in FIGS. 7 and 8. Thus, outer casing terminating member 82 is locked to cable support 86.

Figures 9, 10, 11:
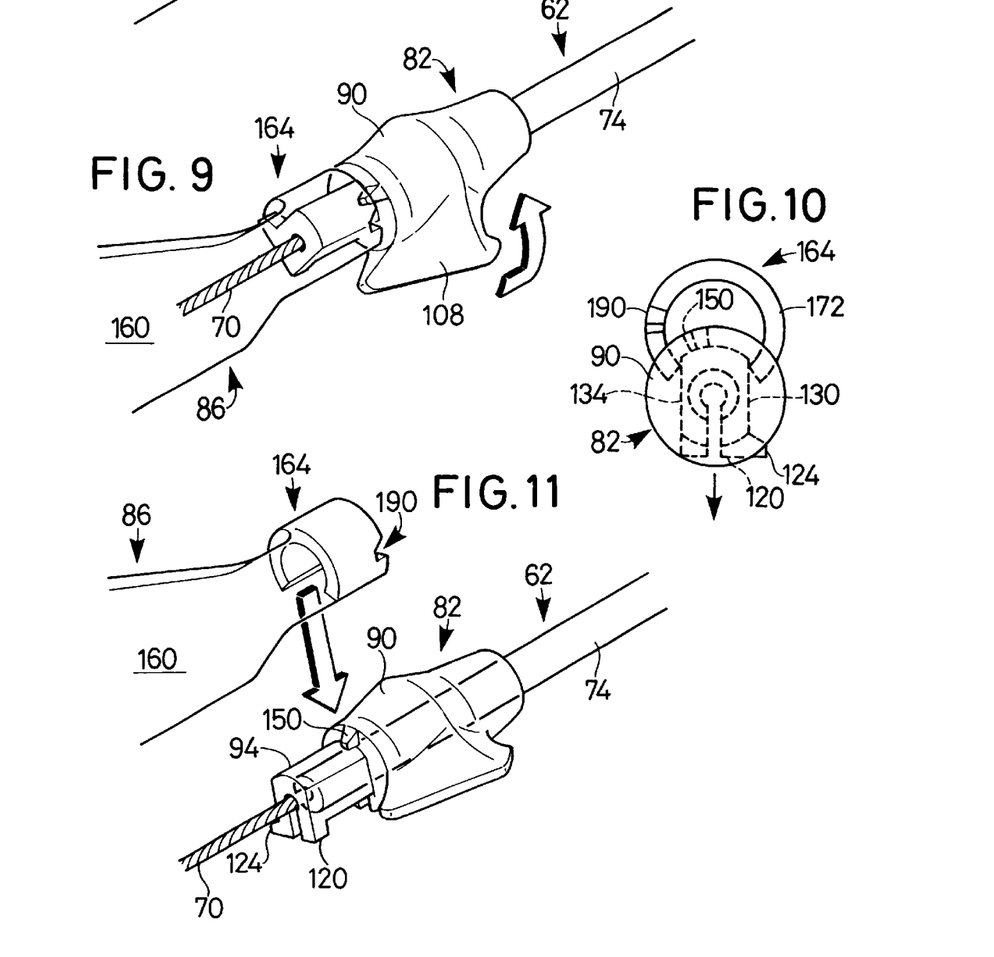
FIG. 9 is a view of the cable connecting apparatus when the first cable connecting member is being turned to disassemble the apparatus.
FIG. 10 is a cross sectional view illustrating the decoupling of the first cable connecting member from the second cable connecting member.
FIG. 11 is a view showing the first cable connecting member decoupled from the second cable connecting member.

To decouple outer casing terminating member 82 from cable support 86, outer casing terminating member 82 is rotated in the direction of the arrow shown in FIG. 9 with the help of finger operating tab 108. The force of such manual rotation is sufficient to cause cam wall 156 of retaining projection 150 to slide against cam wall 196 of retaining recess 190 until first side wall 130 and second side wall 134 of wire guiding projection 94 align with passage 176. Since the distance d1 between first side wall 130 and second side wall 134 is less than or equal to the width W of passage 176, wire guiding projection 94 may be moved out of passage 176 to decouple outer casing terminating member 82 from cable support 86 as shown in FIGS. 10 and 11. Outer casing terminating member 82 may be coupled to cable support 86 by reversing the procedure.

Figure 12:
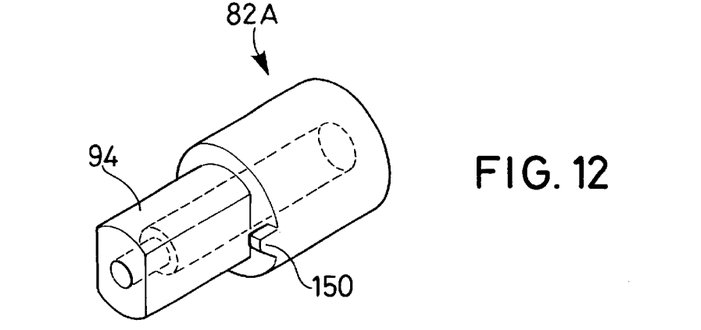
FIG. 12 is an oblique view of an alternative embodiment of the first cable connecting member.

FIGS. 12–15 are oblique views of alternative embodiments of outer casing terminating member 82, represented by the reference numbers 82A–82D, respectively. In each of these embodiments, locking member 120 is omitted. Such an omission is satisfactory when outer casing 74 of Bowden cable 62 exerts a sufficient biasing force against outer casing terminating members 82A–82D to prevent outer casing terminating members 82A–82D from moving away from cable support 86. Also, finger operating tab 108 and slot 157 have been omitted in each embodiment. Omission of slot 157 allows the outer casing support portion and wire guiding projection in each embodiment to be circumferentially continuous. Thus, outer casing terminating member 82A in FIG. 12 is identical to outer casing terminating member 82 in the first embodiment except for the omission of finger operating tab 108, locking member 120 and slot 157.

Figures 13, 14:
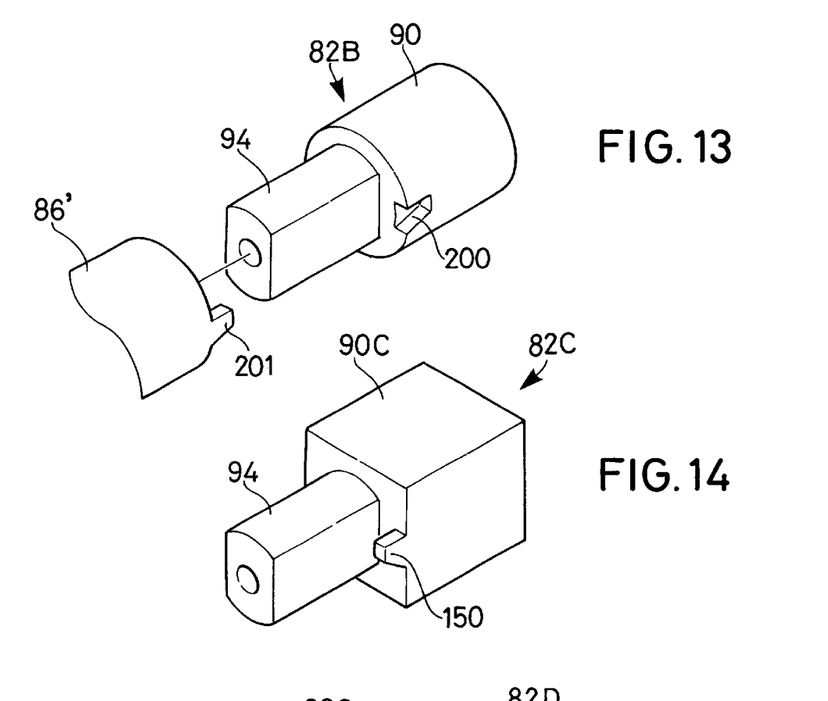
FIG. 13 is an oblique view of another alternative embodiment of the first cable connecting member.
FIG. 14 is an oblique view of another alternative embodiment of the first cable connecting member.

Outer casing terminating member 82B shown in FIG. 13 is substantially the same as outer casing terminating member 82A shown in FIG. 12 except that retaining projection 150 has been replaced by a retaining groove 200. Retaining groove 200 cooperates with a retaining projection 201 that replaces retaining groove 190 on a cable support 86'. Otherwise, this embodiment operates in the same manner as described for the first embodiment.

Figure 15:
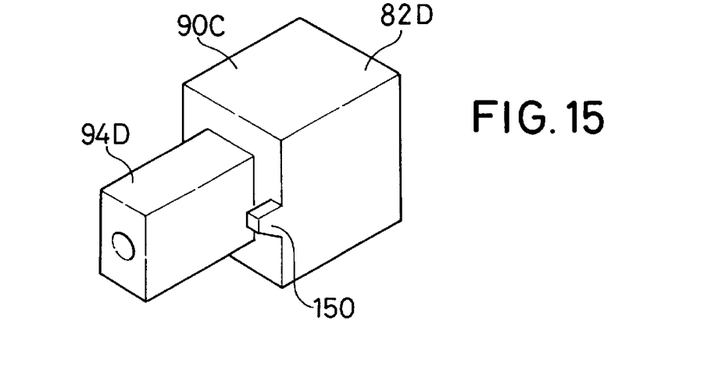
FIG. 15 is an oblique view of another alternative embodiment of the first cable connecting member.

Outer casing terminating member 82C shown in FIG. 14 is substantially the same as outer casing terminating member 82A in FIG. 12 except that an outer casing support portion 90C has a square shape. Similarly, outer casing terminating member 82D shown in FIG. 15 is substantially the same as outer casing terminating member 82C in FIG. 14 except that a wire guiding projection 94D has a square shape.

FIGS. 16–24 are views of an alternative embodiment of a cable connecting apparatus 14' according to the present invention, where structures that are the same as the structures in the first embodiment are numbered the same. Thus, it can be assumed that cable connecting apparatus 14' has the same structure as cable connecting apparatus 14 except where noted.

Figure 16:
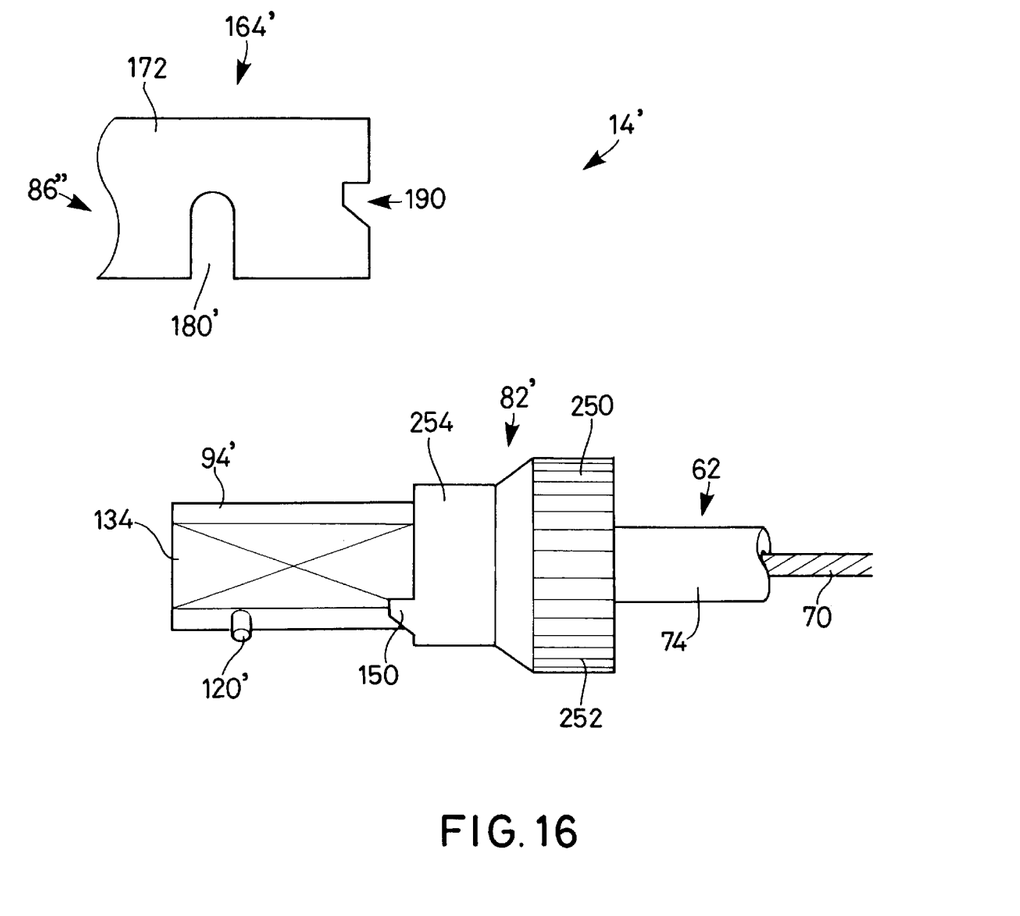
FIG. 16 is an exploded view of an alternative embodiment of a cable connecting apparatus according to the present invention.

In this embodiment, an outer casing terminating member 82' includes a large diameter portion 250 for terminating outer casing 74 of Bowden cable 62 and a small diameter portion 254 that contains retaining projection 150. Large diameter portion 250 has a knurled outer peripheral surface 252 to facilitate gripping and rotation of outer casing terminating member 82'. A locking member 120' in the form of a locking pin extends radially outwardly from an intermediate portion of wire guiding projection 94'. Locking member 120' functions substantially the same as locking member 120 in the first embodiment. Tubular portion 164' of cable support 86" differs from tubular portion 164 in the first embodiment in that passage 180 of the first embodiment is formed as a slot 180'.

Figure 17:
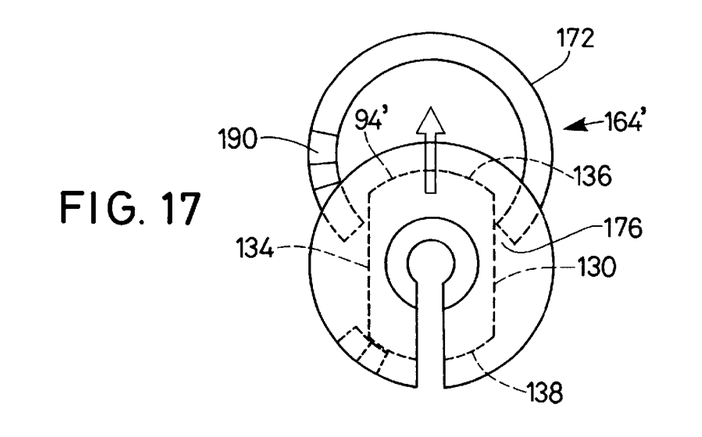
FIG. 17 is a cross sectional view of the cable connecting apparatus showing the first cable connector being inserted into the second cable connector.
Figure 18:
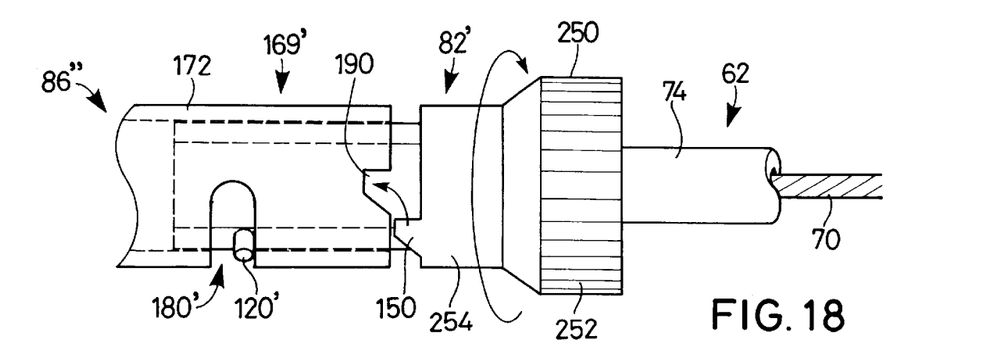
FIG. 18 is a side view of the cable connecting apparatus showing the first cable connector being rotated toward a locking position.
Figure 19:
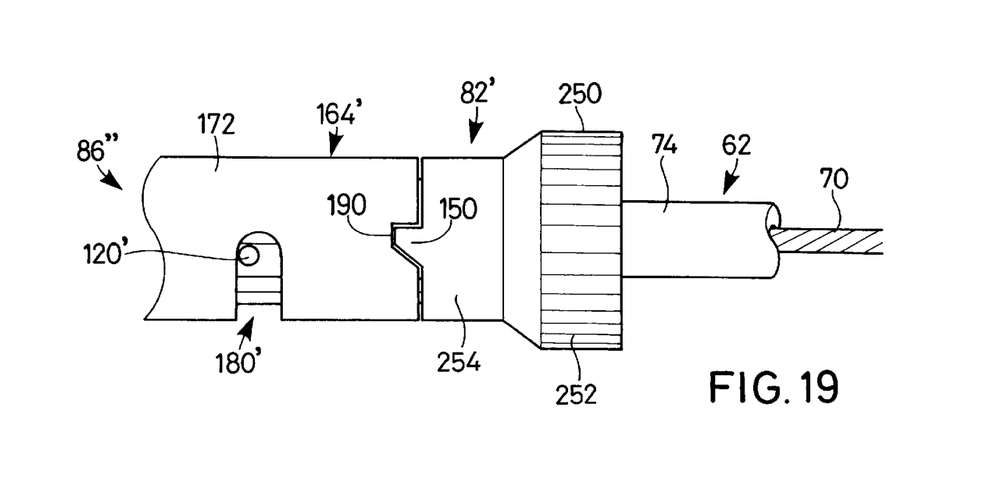
FIG. 19 is a side view of the cable connecting apparatus in a locked state.
Figure 20:
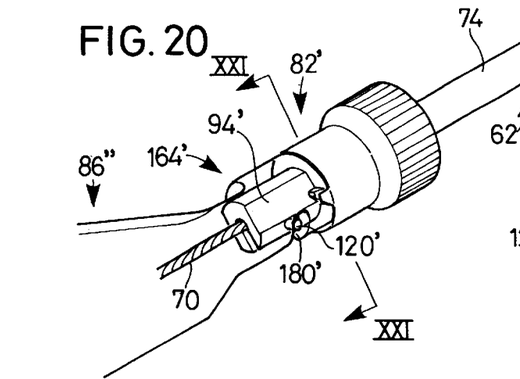
FIG. 20 is a partially transparent view of the cable connecting apparatus in the locked state.
Figure 21:
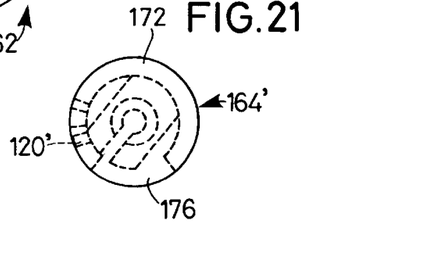
FIG. 21 is a view taken along line XXI—XXI in FIG. 20.
Figures 22, 23, 24:
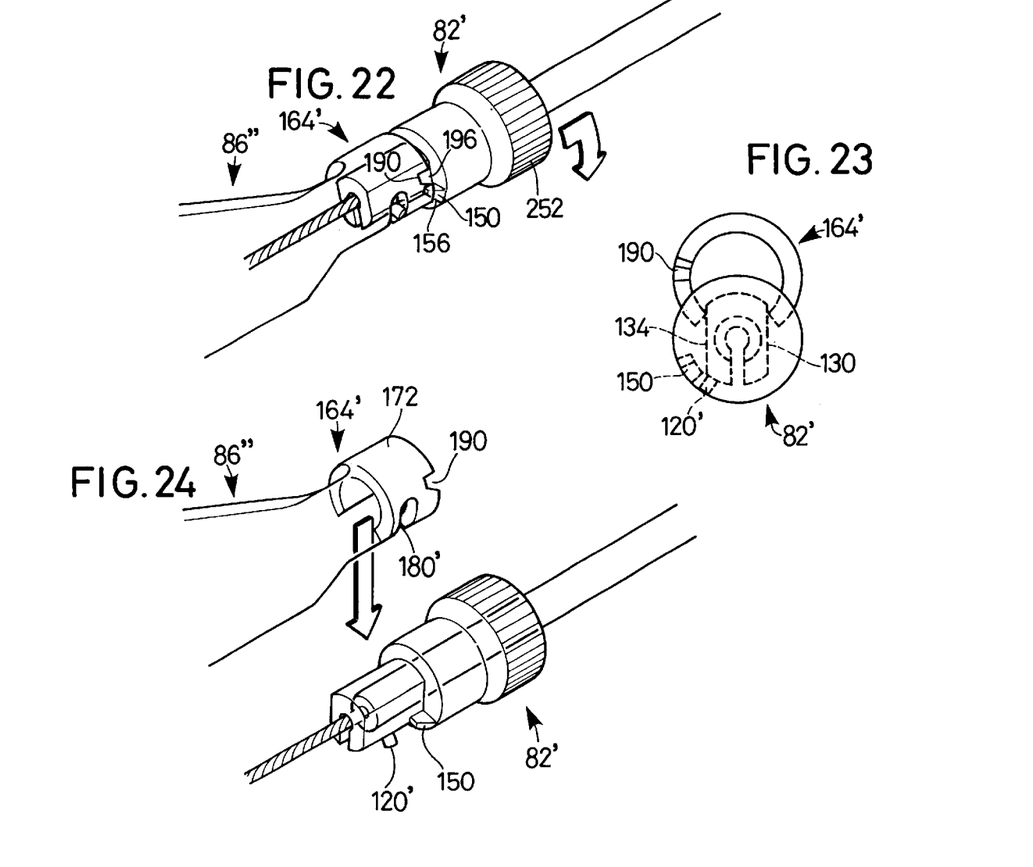
FIG. 22 is a partially transparent view of the cable connecting apparatus showing the first cable connector being rotated toward the unlocked position.
FIG. 23 is a cross sectional view of the cable connecting apparatus showing the first cable connector being decoupled from the second cable connector.
FIG. 24 is an oblique view of the cable connecting apparatus in the decoupled state.

The assembly procedure for cable connecting apparatus 14' is the same as the assembly procedure of cable connecting apparatus 14. Thus, wire guiding projection 94' initially is inserted through passage 176 as shown in FIG. 17, and then outer casing terminating member 82' is rotated as shown in FIG. 18 until retaining projection 150 engages retaining recess 190 and locking member 120' is disposed in slot 180' as shown in FIGS. 19–21. To decouple outer casing terminating member 82' from cable support 86", outer casing terminating member 82' is rotated in the direction of the arrow shown in FIG. 22 with the help of the knurled surface 252. The force of such manual rotation is sufficient to cause cam wall 156 of retaining projection 150 to slide against cam wall 196 of retaining recess 190 until first side wall 130 and second side wall 134 of wire guiding projection 94' align with passage 176. Wire guiding projection 94' then may be moved out of passage 176 to decouple outer casing terminating member 82' from cable support 86' as shown in FIGS. 23 and 24.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle cable connecting apparatus for a control cable having an inner wire disposed in an outer casing comprising:
   a first connecting member including:
      an outer casing support portion having a first end and a second end, wherein the first end has a casing support opening for supporting the outer casing of the control cable;
      a wire guiding projection extending from the second end of the outer casing support portion along a first connecting member axis, wherein the wire guiding projection includes:
         a first side wall extending in a direction of the first connecting member axis;
         a second side wall extending in the direction of the first connecting member axis and opposite the first side wall;
         a third side wall extending in the direction of the first connecting member axis;
         a fourth side wall extending in the direction of the first connecting member axis and opposite the third side wall; and
         an inner wire passage for receiving the inner wire therethrough;
   wherein a distance between the first side wall and the second side wall is less than a distance between the third side wall and the fourth side wall from a location in close proximity to the second end of the outer casing support portion through a free end of the wire guiding projection;
   wherein at least one of the outer casing support portion and the wire guiding projection is continuous in a circumferential direction;
      a first abutment formed at a junction of the second end of the outer casing support portion and the wire guiding projection and facing at least in part in the direction of the first connecting member axis away from the first end; and
      a retaining structure immovably disposed at the first abutment and different from the first side wall and the second side wall, wherein the retaining structure rotates with the first connecting member, wherein the retaining structure forms a second abutment facing at least in part in a circumferential direction.

2. The apparatus according to claim 1 wherein the wire guiding projection comprises a wire guiding tube.

3. The apparatus according to claim 1 wherein the outer casing support portion, the wire guiding projection and the retaining structure are one piece.

4. The apparatus according to claim 1 wherein the retaining structure comprises a retaining projection extending from the first abutment.

5. The apparatus according to claim 1 wherein the retaining structure comprises a retaining recess formed in the first abutment.

6. The apparatus according to claim 1 wherein the retaining structure includes:
   a first retaining structure surface inclined relative to the first abutment; and
   a second retaining structure surface extending from the first retaining structure surface in the circumferential direction.

7. The apparatus according to claim 6 wherein the second abutment extends from the second retaining structure surface to the first abutment.

8. The apparatus according to claim 7 wherein the second abutment is substantially perpendicular to the first abutment.

9. The apparatus according to claim 1 wherein the outer casing support portion comprises an outer casing support tube having a wire receiving passage.

10. The apparatus according to claim 9 wherein the outer casing support tube has a convex shape.

11. The apparatus according to claim 9 further comprising a finger operating member extending radially outwardly from the outer casing support tube.

12. The apparatus according to claim 11 wherein the finger operating member comprises a finger operating tab.

13. The apparatus according to claim 9 wherein the outer casing support tube has a knurled outer peripheral surface.

14. A bicycle cable connecting apparatus for a control cable having an inner wire disposed in an outer casing comprising:
   a first connecting member including:
      an outer casing support portion having a first end and a second end, wherein the first end has a casing support opening for supporting the outer casing of the control cable;
         wherein the outer casing support portion comprises an outer casing support tube having a wire receiving passage;
      a wire guiding projection extending from the second end of the outer casing support portion along a first connecting member axis, wherein the wire guiding projection includes:
         a first side wall extending in a direction of the first connecting member axis;
         a second side wall extending in the direction of the first connecting member axis and opposite the first side wall;
         a third side wall extending in the direction of the first connecting member axis;
         a fourth side wall extending in the direction of the first connecting member axis and opposite the third side wall; and
         an inner wire passage for receiving the inner wire therethrough;
   wherein a distance between the first side wall and the second side wall is less than a distance between the third side wall and the fourth side wall;
   wherein at least one of the outer casing support portion and the wire guiding projection is continuous in a circumferential direction;
      a first abutment formed at a junction of the second end of the outer casing support portion and the wire guiding projection and facing at least in part in the direction of the first connecting member axis away from the first end; and
      a retaining structure immovably disposed at the first abutment and different from the first side wall and the second side wall, wherein the retaining structure rotates with the first connecting member, wherein the retaining structure forms a second abutment facing at least in part in a circumferential direction;

wherein the outer casing support tube includes a large diameter portion and a small diameter portion, and wherein the large diameter portion has a knurled outer peripheral surface.

15. The apparatus according to claim 1 wherein the first side wall is substantially parallel to the second side wall.

16. The apparatus according to claim 1 wherein the outer casing support opening extends into the wire guiding projection.

17. A bicycle cable connecting apparatus for a control cable having an inner wire disposed in an outer casing comprising:

a first connecting member including:
   an outer casing support portion having a first end and a second end, wherein the first end has a casing support opening for supporting the outer casing of the control cable;
   a wire guiding projection extending from the second end of the outer casing support portion along a first connecting member axis, wherein the wire guiding projection includes:
      a first side wall extending in a direction of the first connecting member axis;
      a second side wall extending in the direction of the first connecting member axis and opposite the first side wall;
      a third side wall extending in the direction of the first connecting member axis;
      a fourth side wall extending in the direction of the first connecting member axis and opposite the third side wall; and
      an inner wire passage for receiving the inner wire therethrough;
   wherein a distance between the first side wall and the second side wall is less than a distance between the third side wall and the fourth side wall;
   wherein at least one of the outer casing support portion and the wire guiding projection is continuous in a circumferential direction;
      a first abutment formed at a junction of the second end of the outer casing support portion and the wire guiding projection and facing at least in part in the direction of the first connecting member axis away from the first end;
      a retaining structure immovably disposed at the first abutment and different from the first side wall and the second side wall, wherein the retaining structure rotates with the first connecting member, wherein the retaining structure forms a second abutment facing at least in part in a circumferential direction; and
   wherein the wire guiding projection includes a radially outwardly extending locking member.

18. The apparatus according to claim 17 wherein the locking member is disposed at a free end of the wire guiding projection.

19. The apparatus according to claim 17 wherein the locking member is disposed at an intermediate portion of the wire guiding projection.

20. A bicycle cable connecting apparatus for a control cable having an inner wire disposed in an outer casing comprising:

a first connecting member including:
   an outer casing support portion having a first end and a second end, wherein the first end has a casing support opening for supporting the outer casing of the control cable;
   a wire guiding projection extending from the second end of the outer casing support portion along a first connecting member axis, wherein the wire guiding projection includes:
      a first side wall extending in a direction of the first connecting member axis;
      a second side wall extending in the direction of the first connecting member axis and opposite the first side wall;
      a third side wall extending in the direction of the first connecting member axis;
      a fourth side wall extending in the direction of the first connecting member axis and opposite the third side wall; and
      an inner wire passage for receiving the inner wire therethrough;
   wherein a distance between the first side wall and the second side wall is less than a distance between the third side wall and the fourth side wall;
   wherein at least one of the outer casing support portion and the wire guiding projection is continuous in a circumferential direction;
      a first abutment formed at a junction of the second end of the outer casing support portion and the wire guiding projection and facing at least in part in the direction of the first connecting member axis away from the first end; and
      a retaining structure immovably disposed at the first abutment and different from the first side wall and the second side wall, wherein the retaining structure rotates with the first connecting member, wherein the retaining structure forms a second abutment facing at least in part in a circumferential direction;
a second connecting member including a tubular portion defining a first connecting member opening for receiving the wire guiding projection therein and having:
   a first tubular portion side wall extending along a second connecting member axis and defining a first passage for passing the wire guiding projection in a direction of the second connecting member axis away from the first connecting member opening; and
   a second tubular portion side wall defining a second passage extending from the first passage in a circumferential direction.

21. The apparatus according to claim 20 wherein the tubular portion includes a retaining structure engaging structure for engaging the retaining structure of the first connecting member.

22. The apparatus according to claim 21 wherein the retaining structure engaging structure comprises a retaining structure engaging recess.

23. The apparatus according to claim 21 wherein the retaining structure engaging structure comprises a retaining structure engaging projection.

24. The apparatus according to claim 21 wherein the tubular portion includes a third tubular portion side wall substantially perpendicular to the second connecting member axis, wherein the retaining structure engaging structure is disposed on the third tubular portion side wall.

25. The apparatus according to claim 20 wherein the second connecting member further includes an annular frame coupling member having a central axis oriented substantially perpendicular to the second connecting member axis.

26. The apparatus according to claim 25 wherein the second connecting member further includes an annular transmission actuating member concentric with and rotatably supported relative to the frame coupling member.

27. A bicycle cable connecting apparatus for a control cable having an inner wire disposed in an outer casing comprising:
- a first connecting member including:
  - an outer casing support portion having a first end and a second end, wherein the first end has a casing support opening for supporting the outer casing of the control cable;
  - a wire guiding projection extending from the second end of the outer casing support portion along a first connecting member axis, wherein the wire guiding projection includes an inner wire passage for receiving the inner wire therethrough, and wherein the wire guiding projection includes a radially extending locking member outside the inner wire passage and forming a first abutment facing at least in part in a direction of the first connecting member axis toward the first end;
  - a second abutment formed at a junction of the second end of the outer casing support and the wire guiding projection and facing at least in part in a direction of the first connecting member axis away from the first end;
  - a retaining structure immovably disposed on the second end of the outer casing support portion, wherein the retaining structure rotates with the first connecting member, wherein the retaining structure forms a third abutment facing at least in part in a circumferential direction, and wherein the retaining structure is spaced apart in the direction of the first connecting member axis from one of the first abutment and the second abutment.

28. A bicycle cable connecting apparatus for a control cable having an inner wire disposed in an outer casing comprising:
- a first connecting member including:
  - an outer casing support portion having a first end and a second end, wherein the first end has a casing support opening for supporting the outer casing of the control cable;
  - a wire guiding projection extending from the second end of the outer casing support portion along a first connecting member axis, wherein the wire guiding projection includes an unthreaded outer peripheral surface along its entire length in a direction of the first connecting member axis and an inner wire passage for receiving the inner wire therethrough;
  - wherein the wire guiding projection includes:
    - a first side wall extending in a direction of the first connecting member axis;
    - a second side wall extending in the direction of the first connecting member axis and opposite the first side wall;
    - a third side wall extending in the direction of the first connecting member axis;
    - a fourth side wall extending in the direction of the first connecting member axis and opposite the third side wall; and
      - wherein a distance between the first side wall and the second side wall is less than a distance between the third side wall and the fourth side wall from a location in close proximity to the second end of the outer casing support portion through a free end of the wire guiding projection;
  - wherein at least one of the outer casing support portion and the wire guiding projection is continuous in a circumferential direction;
  - a first abutment formed at a junction of the second end of the outer casing support portion and the wire guiding projection and facing at least in part in the direction of the first connecting member axis away from the first end; and
  - a retaining structure immovably disposed at the first abutment, wherein the retaining structure rotates with the first connecting member, wherein the retaining structure forms a second abutment facing at least in part in the circumferential direction.

29. A bicycle cable connecting apparatus for a control cable having an inner wire disposed in an outer casing comprising:
- a first connecting member including:
  - an outer casing support portion having a first end and a second end, wherein the first end has a casing support opening for supporting the outer casing of the control cable;
  - a wire guiding projection extending from the second end of the outer casing support portion along a first connecting member axis, wherein the wire guiding projection includes:
    - a first side wall extending in a direction of the first connecting member axis;
    - a second side wall extending in the direction of the first connecting member axis and opposite the first side wall;
    - a third side wall extending in the direction of the first connecting member axis;
    - a fourth side wall extending in the direction of the first connecting member axis and opposite the third side wall; and
    - an inner wire passage for receiving the inner wire therethrough;
      - wherein a distance between the first side wall and the second side wall is less than a distance between the third side wall and the fourth side wall from a location in close proximity to the second end of the outer casing support portion through a free end of the wire guiding projection;
  - a first abutment formed at a junction of the second end of the outer casing support portion and the wire guiding projection and facing at least in part in the direction of the first connecting member axis away from the first end;
  - a retaining structure immovably disposed at the first abutment and different from the first side wall and the second side wall, wherein the retaining structure rotates with the first connecting member, wherein the retaining structure forms a second abutment facing at least in part in a circumferential direction; and
    - wherein the wire guiding projection includes a slot for passing the inner wire radially into the inner wire passage.

* * * * *